Figure 10:
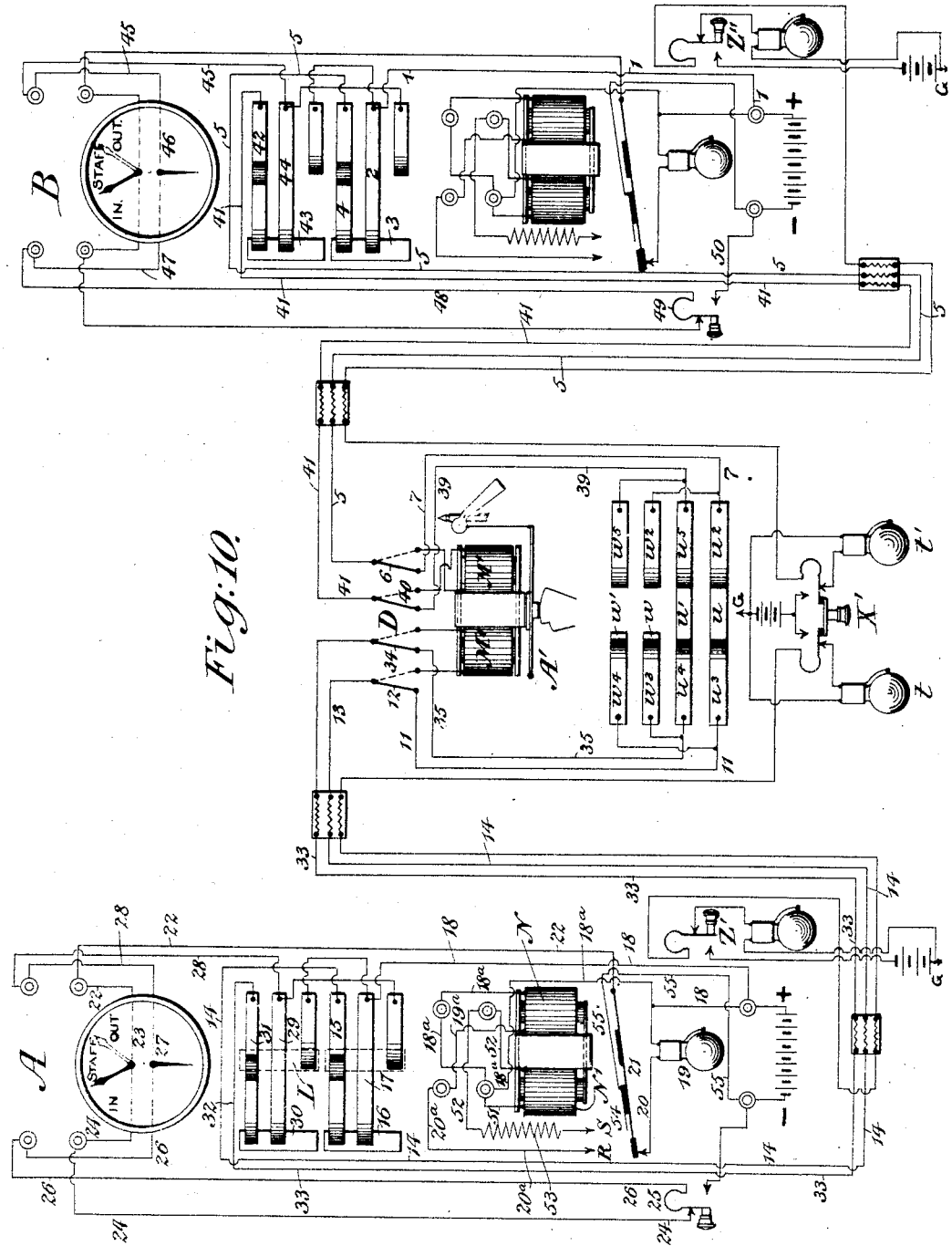

No. 792,922. PATENTED JUNE 20, 1905.
T. H. PATENALL.
APPARATUS FOR CONTROLLING TRAFFIC ON RAILWAYS.
APPLICATION FILED OCT. 27, 1904.
6 SHEETS—SHEET 1.
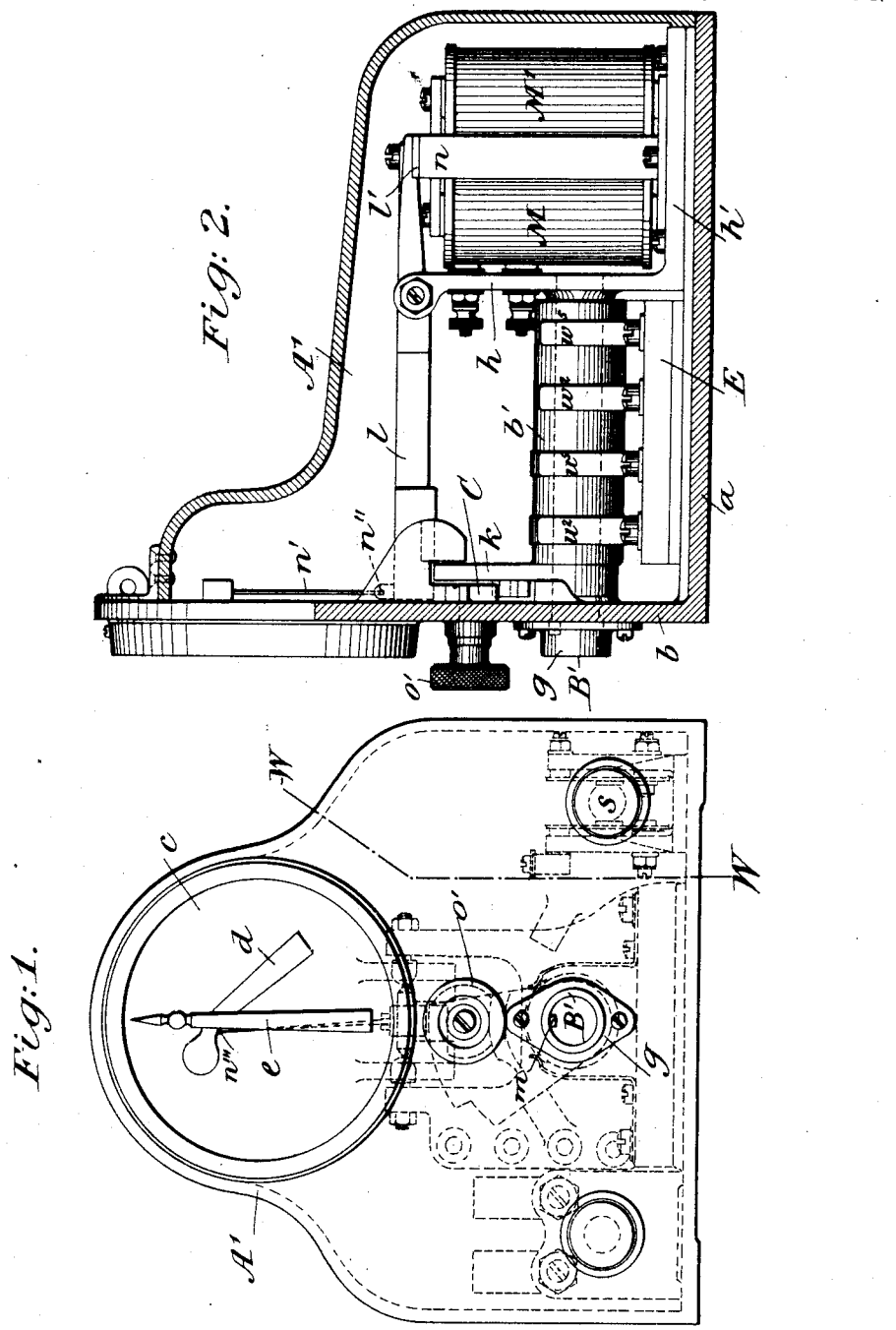
WITNESSES:
INVENTOR
Thomas H. Patenall
BY
ATTORNEY

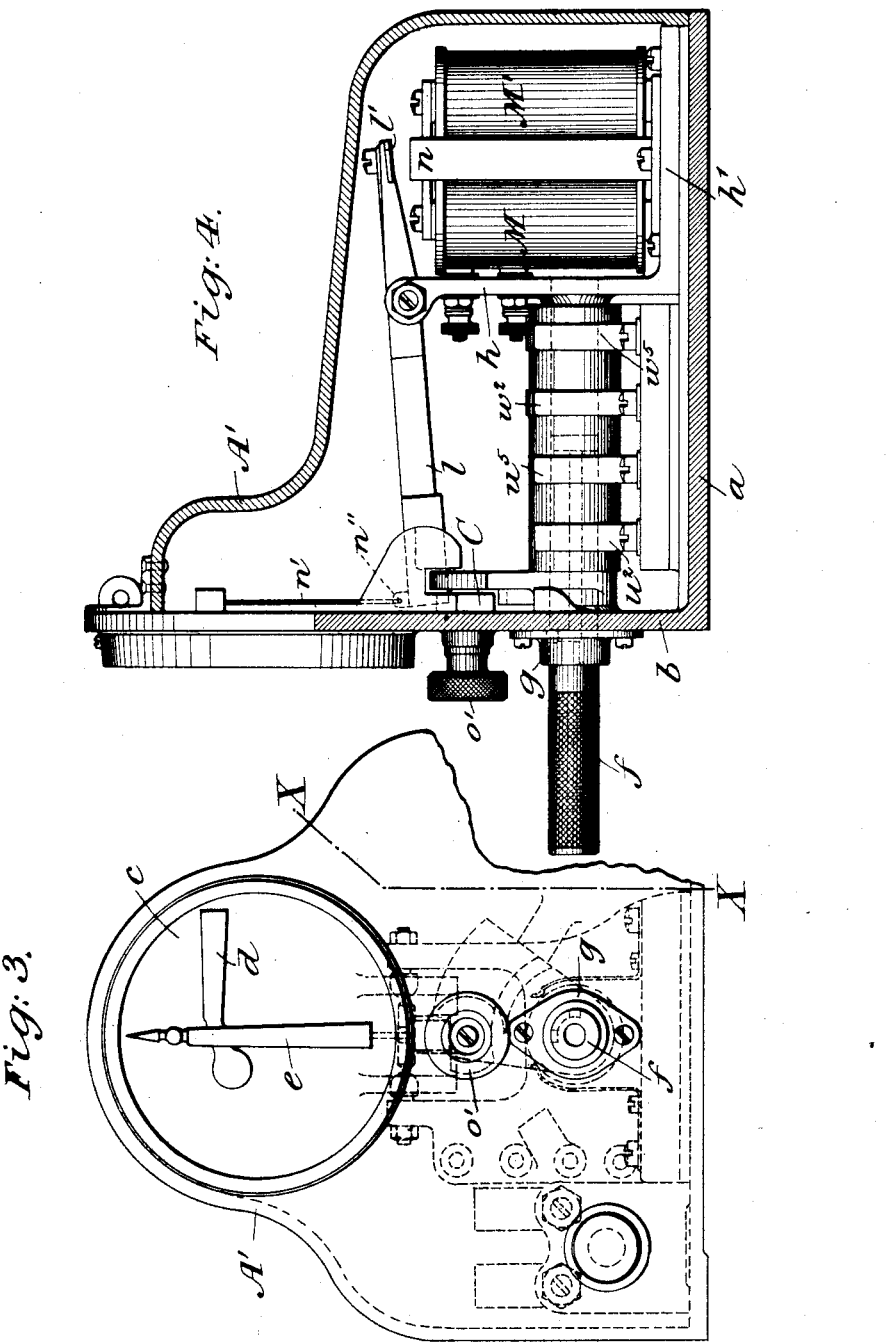

No. 792,922. PATENTED JUNE 20, 1905.
T. H. PATENALL.
APPARATUS FOR CONTROLLING TRAFFIC ON RAILWAYS.
APPLICATION FILED OCT. 27, 1904.
6 SHEETS—SHEET 3.
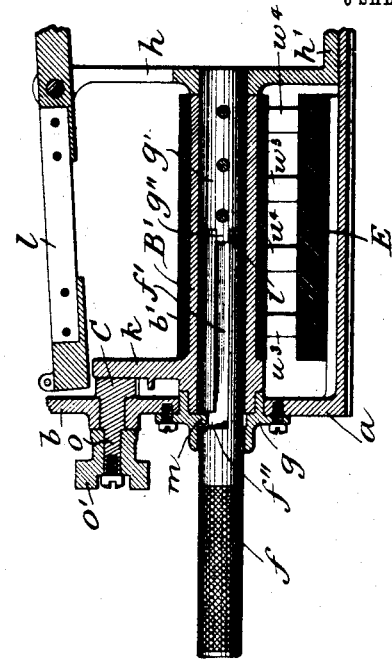
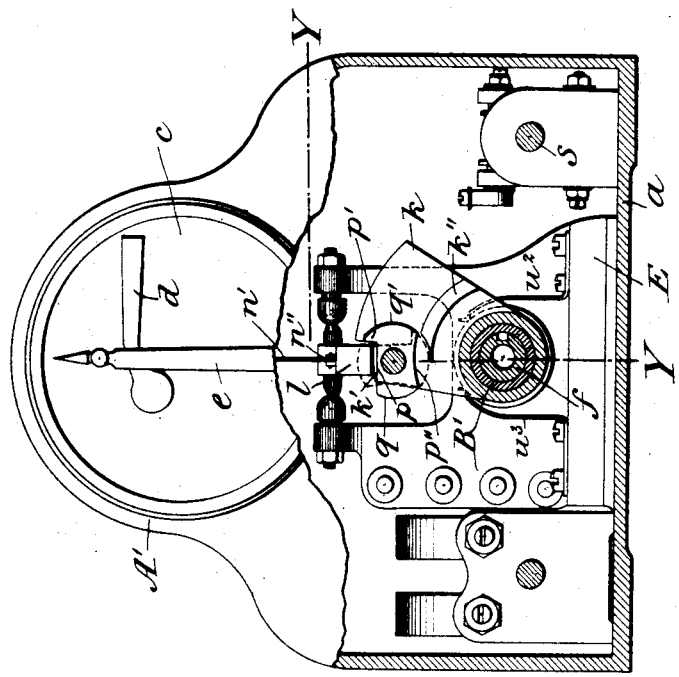
WITNESSES:
W. P. Bradley.
A. Herman Wegner.
INVENTOR
Thomas H. Patenall
BY
Geo. E. Cruse.
His ATTORNEY No. 792,922. PATENTED JUNE 20, 1905.
T. H. PATENALL.
APPARATUS FOR CONTROLLING TRAFFIC ON RAILWAYS.
APPLICATION FILED OCT. 27, 1904.
6 SHEETS—SHEET 4.
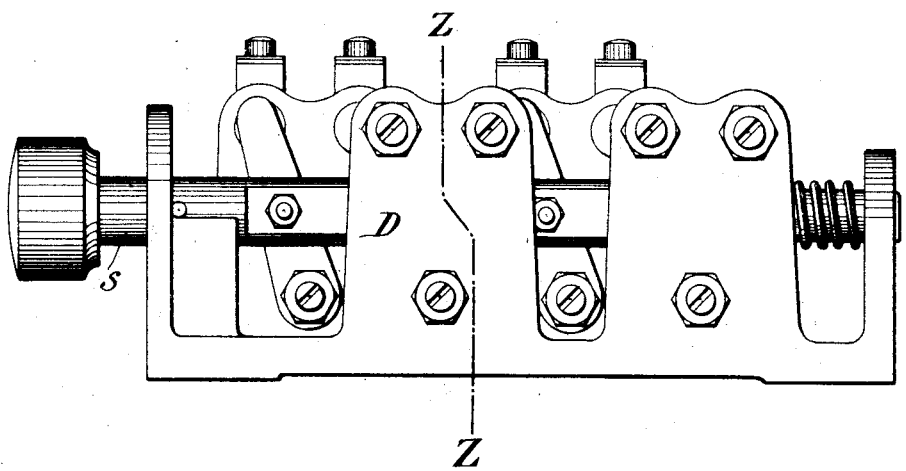
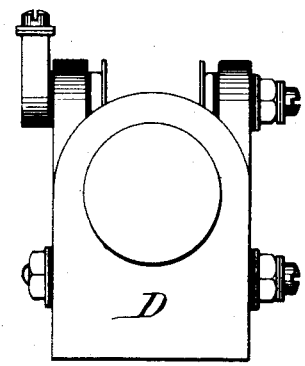
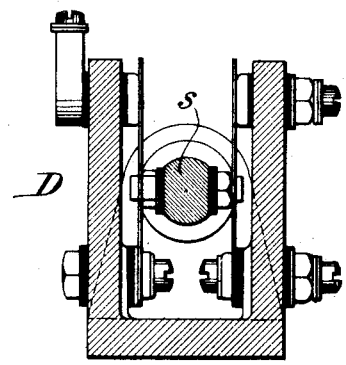

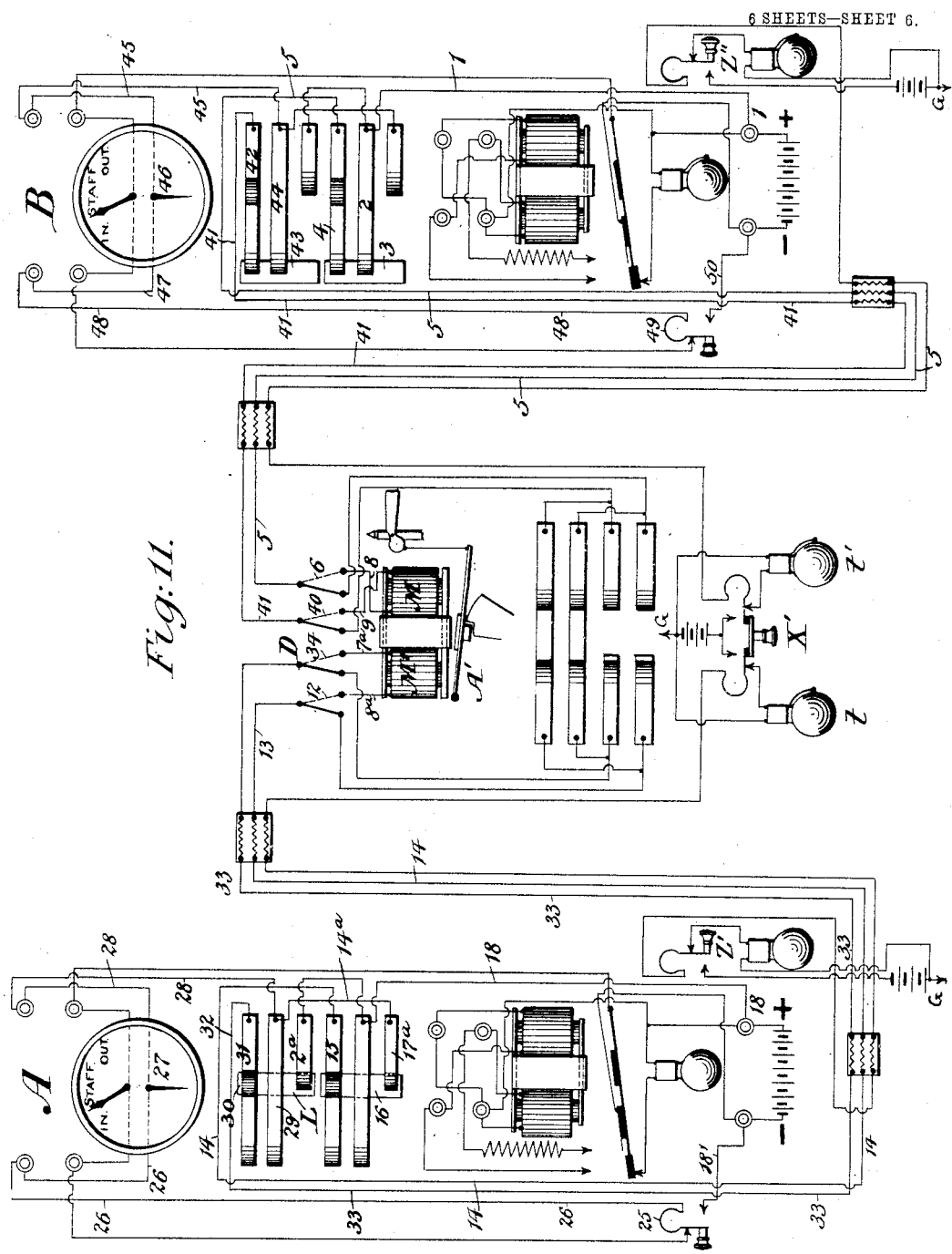

No. 792,922.

Patented June 20, 1905.

UNITED STATES PATENT OFFICE.

THOMAS H. PATENALL, OF WILKINSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

APPARATUS FOR CONTROLLING TRAFFIC ON RAILWAYS.

SPECIFICATION forming part of Letters Patent No. 792,922, dated June 20, 1905.

Application filed October 27, 1904. Serial No. 230,217.

*To all whom it may concern:*

Be it known that I, THOMAS H. PATENALL, a citizen of the United States, residing at Wilkinsburg, in the county of Allegheny and State of Pennsylvania, have invented certain new and useful Improvements in Apparatus for Controlling Traffic on Railways; and I do hereby declare that the following is a full, clear, and exact description, sufficient to enable others skilled in the art to which it appertains to make and use the invention.

My invention relates to improvements in apparatus involved in what is known in the art as "staff systems," which systems are used for controlling traffic on single-track railroads.

My invention has more especial reference to a construction of electrically-locked staff circuit-controller adaptable for use in connection with many of the ordinary types of what are known as "staff instruments" and which is particularly designed for the purpose of increasing the operating facilities of any piece or pieces of single track without the necessity of providing additional staff instruments and operators therefor at such siding or sidings as may be found essential or expedient to use in attaining this end.

My invention, which comprises a simple and inexpensive electrically-locked staff circuit-controller, to be hereinafter fully described, is located at what may be termed a "passing-siding" and is connected up with the staff instruments at each end of the block or section of track to be protected by appropriate electrical circuits, being so arranged that when a staff (which may have been withdrawn from an instrument at either end of the block, thereby throwing such instruments out of synchronism and locking them against the removal of another staff) has been inserted within the controller and properly moved to lock it therein the staff instruments will again be thrown into synchronism to permit of another staff being withdrawn from either one, so that a train or trains may be allowed to pass over such block while the first train is on the siding.

My invention further comprises electrically-controlled locking means for locking the staff within the controller, whereby it is rendered necessary for the operators at both ends of the block to simultaneously manipulate their respective instruments in order to effect the release of such staff to permit of its removal and coincidently affecting the mechanism so as to again throw the staff instruments out of synchronism, thereby preventing the removal of another staff from either instrument and effectually closing the block against the movement of trains thereover in either direction, and thus permitting the train on the siding to move onto the main track and resume its journey in safety.

My invention further comprises certain novel features of construction and arrangement of parts, all of which will be hereinafter fully described, and particularly pointed out in the appended claims.

In the accompanying drawings similar reference letters and numerals indicate corresponding parts in all the figures.

Figure 1 is a front view of a controller embodying my invention, parts of the mechanism thereof being shown in dotted lines and in their normal condition or no staff in. Fig. 2 is a sectional elevation taken approximately through the line W W, Fig. 1. Fig. 3 is a front view of the controller shown in Fig. 1, but with a staff inserted and locked therein. Fig. 4 is a sectional elevation taken approximately through the line X X, Fig. 3, also with the staff in and locked. Fig. 5 is a front elevation of the controller shown in Fig. 1 with staff in and locked, the lower part of the case being broken away. Fig. 6 is a sectional detail view taken through the line Y Y, Fig. 5, with staff in and locked. Fig. 7 is a side elevation of a switch embodied in my invention for changing the direction of main current. Fig. 8 is a front view of the switch shown in Fig. 7. Fig. 9 is a section thereof, taken on the line Z Z, Fig. 7. Fig. 10 is a diagrammatic view of an arrangement of circuits between two staff instruments and including my invention, the circuits and all apparatus being in what may be termed the "normal" or "usual" condition. Fig. 11 is a view similar to Fig. 10, showing the conditions of circuits with a staff out of one of the staff instruments and locked in the controller.

Referring now more particularly to Figs. 1 to 6, inclusive, A' designates a controller embodying my invention, the working parts of which are supported partly on a suitable base-plate $a$ and partly within a vertical extension or plate $b$, which latter is preferably, but not necessarily, made integral with the base-plate and is provided at its upper extremity with a central orifice $c$, within which is located a miniature signal-blade $d$, pivotally secured to a post $e$ and adapted to rise and fall, so as to assume the danger and clear position when a staff $f$ is inserted within or withdrawn from the controller, as I shall presently describe. B' designates a sleeve or socket for the reception of the staff $f$, the outer end of which is preferably supported in an escutcheon $g$, secured to the plate $b$, while its inner end has secured within it a plug $g'$, which takes the form of a short shaft and which projects sufficiently beyond the edge of the sleeve or socket to enter a bearing formed in a bracket $h$, fastened to the base-plate $a$. The inner extremity of the plug $g'$ is provided with a tooth $g''$, which is adapted to enter a recess $i$, formed in the end of the staff $f$, whereby when the latter has been inserted within the socket or sleeve and turned said sleeve or socket will also turn with it. A suitable locking provision is provided for the purpose of locking the sleeve or socket B' after it has been turned by the staff, so that a removal of the latter is rendered impossible, as will be hereinafter more fully described. This locking provision comprises a segment $k$, which is preferably made integrally with the socket or sleeve and having at one end a notch or depression, as represented at $k'$, for the reception of the locking-lever $l$, pivotally supported in the bracket $h$, whereby said socket or sleeve is effectively locked against a return movement. The opposite end of this lever $l$ has secured to it an armature-plate $l'$, which normally rests upon the pole-piece $n$ of magnets M M', supported on a horizontal base portion $h'$ of the bracket $h$ when the segment is in its normal position, (shown in dotted lines in Fig. 1,) in which position the outer end of the locking-lever will rest on the upper face of the segment $k$, so that when the staff has been inserted within the socket or sleeve B' the latter will be permitted to be turned by it to bring its notched portion in register with the lever $l$ and allowing it to fall therein, as previously described, thus lifting the armature-plate $l'$ away from the magnets M M', as clearly shown in Fig. 4. The outer end of the locking-lever $l$ is connected to the signal-blade $d$ by means of a link or rod $n'$, pivotally secured to both, as represented at $n''$ and $n'''$, respectively, and it will thus be apparent that under the influence of said locking-lever the blade will rise and fall, so as to assume either the danger or clear position when a staff has been inserted in or withdrawn from the controller. C designates a cam rotatively mounted on a short shaft $o$, which is supported in and projects through an opening in the plate $b$, its outer end being provided with a suitable knob $o'$, by which it may be turned to lift the end of the locking-lever $l$ out of the notch in the segment $k$, thereby releasing the latter and bringing the armature-plate $l'$ into contact with and under the influence of the magnets M M', where it will remain if said magnets have been properly energized. The cam C is of peculiar construction and is not only intended for lifting the locking-lever to release the segment, bringing the armature $l'$ within the field of the magnets M M', as just described, but it is also intended to prevent a return movement of the said segment under certain conditions, and it will be observed by especial reference to Fig. 5 that its upper surface $p$ is flattened for a portion of its length and then terminates in a hook or shoulder $p'$, whose face lies approximately in a direct line with the edges of the notch $k'$. The lower side of the cam is concaved, as represented at $p''$, to conform to the concentric contour of a laterally-projecting flange $k''$, formed on the face of the segment $k$. The cam C is further formed with concentric side portions $q$ and $q'$, respectively, and the flange $k''$ on the segment $k$ at one end is concaved, as shown, to conform to such concentric portions $q$ and $q'$, so that when the parts are in the position shown in Fig. 5, which is the position they will assume when a staff has been inserted within the controller and properly locked therein, said cam may be turned to the right to lift the locking-lever, as previously described. In this position it will be apparent that the flange $k''$ will be free to move under the cam C while the staff is being turned to bring it into proper position for removal from the controller. The shoulder or hook $p'$ on the cam C engages the locking-lever $l$ when the latter is at rest within the notch $k'$ of the segment $k$, and it will therefore be apparent that said cam can only be turned in one direction—to the right—and that during such rotative movement its concentric portions $q$ and $q'$ will be free to pass the concaved extremity of the flange $k''$, as shown clearly in dotted lines in Fig. 5, bringing said cam into the path of travel of said flange $k''$, and thereby preventing said segment from being returned to its initial position. In the event of the magnets M M' being deënergized the locking-lever $l$ will when the cam has been returned to its initial position fall by gravity into the notch $k'$ of the segment, and until such time as said magnets M M' are energized, which can only be accomplished by the proper manipulation of and with the consent of the operators at the staff instruments at both ends of the block, it will be apparent that a staff cannot be removed from the controller and that safety in the control of the traffic is therefore maintained at all times. The staff $f$ is provided with a longitudinal groove or kerf $f'$, which extends from the outer end thereof to a point contiguous to the escutcheon $g$, where it terminates in a short circumferential extension $f''$, into which a suitable tooth or projection $m$, formed at the opening in the escutcheon, is adapted to enter when the staff is being inserted within the socket or sleeve B'. Thus it will be apparent that when a staff has been inserted within said sleeve or socket and the segment has in turn been locked, as clearly shown in Figs. 5 and 6, such staff cannot be withdrawn by reason of said tooth or projection $m$ engaging the wall of the circumferential extension $f''$ of the groove or kerf $f'$.

Referring now to Figs. 7, 8, and 9 of the drawings, D designates a switch for changing the direction of the main current and causing it to pass through and energize the magnets M M' at such time or times as the operators at both ends of the block have closed the circuits in their respective staff instruments in order to permit of the removal of a staff from the controller, and the said switch comprises appropriate contact-plates located upon either side of a spring-actuated push-rod $s$, which are adapted to impinge suitable binding-posts, which connect, respectively, with the main circuits and with those of the magnets M M'. Normally these contact-pieces are adjusted so as to close the main circuit; but by pushing upon the rod $s$ they will be shifted to the magnet-circuits, wherein the current will be transferred, thereby energizing said magnets and causing the armature-plate $l'$ to adhere to the pole-piece thereof, and so enabling the engineer or conductor of the train at the siding to manipulate the controller, as previously described, to permit him to remove the staff therefrom.

Suitable alarm-bells $t$ and $t'$, Figs. 10 and 11, are provided within the controller, the one, $t$, being connected up by appropriate electric circuits with the bell-key Z' of the staff instrument A, and the other bell $t'$ is similarly connected up with a bell-key Z'' of the staff instrument B. Thus when the operator at B, for example, presses upon the bell-key Z'' the circuit which leads to the alarm-bell $t'$ will be closed and the alarm sounded in the controller. A similar manipulation of the key-bell Z' by the operator at the instrument A will close the circuit leading to the alarm-bell $t$, causing it also to sound an alarm.

A bell-key X' is provided in the controller A' and is connected up by appropriate circuits with the bells in the respective staff instruments, so that when the engineer or conductor of the train at the siding presses upon said bell-key the circuits will be closed and an alarm simultaneously sounded by the bells in each of the staff instruments, thus indicating that it is his desire to withdraw the staff from the controller.

The sleeve or socket B' is surrounded by a hard-rubber or insulated covering $b'$, upon which are placed a series of contact-strips $u$ $u'$ and $w$ $w'$, which are adapted to engage contact-pieces $u^2$ $u^3$ $u^4$ $u^5$ and $w^2$ $w^3$ $w^4$ $w^5$, which latter are supported on an insulated block E, secured to the base $a$ and being so disposed with relation to each other that when the parts are in their normal position—i. e., when no staff is in the controller—the circuit in the main line will be closed, so that a staff may be withdrawn from an instrument at either end of the block, and thereby throwing such instruments out of synchronism. When, however, a staff has been inserted and properly locked within the controller, the contact-strips $u$ $u'$ will be removed away from the contact-pieces $u^3$ $u^4$, thereby breaking the circuit at those points and simultaneously bringing the contact-strips $w$ $w'$ into engagement with the contact-pieces $w^2$ $w^5$ and $w^3$ $w^4$, putting the staff instruments into synchronism, so as to permit of another staff being removed from either staff instrument.

I will now describe the electric circuits which control the operating mechanism, having special reference to Fig. 10, wherein they are shown under normal conditions. The bell-key 49 in staff instrument B will be pressed by the operator thereat, closing the points on line 50, thus causing the current to flow from the positive end of the battery, through line 1, strip 2, plate 3, strip 4, line 5, to spring 6 of switch in the controller A', thence through line 7, to contact $u^2$, strip $u$, contact $u^3$ to line 11, thence through contact-spring 12 of said switch to lines 13 and 14, strip 15, plate 16, strip 17, line 18, bell 19, line 20, armature 21, line 22, through indicator 23, line 24, bell-key strip 25 in staff instrument A, to line 26, through indicator 27 therein, thence to line 28, strip 29, plate 30, strip 31, lines 32 and 33, spring 34 of switch D in controller, to line 35, contact $u^4$, strip $u'$, and contact $u^5$ to line 39, spring 40 of switch D, thence through line 41, strip 42, plate 43, strip 44, line 45, through indicator 46 in instrument B to lines 47 and 48, to bell-key 49 in instrument B, to point in line 50, back to negative side of battery, thus completing the circuit and ringing the bell in the instrument A.

In order to release a staff from the instrument A, for example, the armature therein will be lifted, so as to close the two points represented at R S, and the circuits described above will follow in the same sequence as far as the line numbered 18, whence it will pass along line 18$^a$, through magnet N, lines 19$^a$ and 20$^a$, to armature 21, through line 22, back to the negative side of battery in instrument B. The lifting of armature at A also closes a local circuit therein, the currents flowing from the positive side of the battery through lines 18, 18ª, and 51, through magnet N', line 52, resistance 53, point S, spring 54, and line 55, back to negative side of battery, thereby energizing said magnets N N' and holding armature up, so that a staff may be withdrawn, such withdrawal of the staff throwing the staff instruments out of synchronism. The removal of such staff shifts the plates 16 and 30 to the position shown in dotted lines at L, Fig. 10, thus changing the direction of the current in and neutralizing the attractive power of the magnets N N', allowing the armature to fall. The insertion of the staff within the controller, as previously described, again synchronizes the instruments and permits of another staff being withdrawn from either instrument or from the controller itself; but when a staff has been removed from any of these instruments another cannot be removed from the other or others.

In Fig. 11 the circuits are shown as they are effected by the insertion of a staff within the controller and where the staff therein may be released. Commencing at the positive end of the battery in the instrument B, the current will flow through line 1, strip 2, plate 3, strip 4, line 5, to spring 6 to switch in the controller, (dotted lines,) thence through line 8, magnet M, line 9, to spring 40 (dotted lines) of the controller-switch, line 41, strip 42, plate 43, strip 44, line 45, through indicator 46, lines 47 and 48 to key-spring 49, and point on line 50, to the negative side of battery, thus completing the circuit, and in the instrument at A, commencing at the positive end of battery, the current will flow through line 18, strip 2ª, plate 29, strip 31, lines 32 and 33 to contact-spring 34 (dotted lines) of switch in controller, thence by line 7ª through magnet M', line 8ª, to contact-spring 12 (dotted lines) of said switch, thence through lines 13 and 14, strip 15, plate 16, strip 17ª, lines 14ª and 28, through indicator 27, along line 26, to key-spring 25, and through point on line 18' to negative side of battery, thus completing the circuit and coincidently energizing the magnets M M', so as to cause the armature of the locking-lever *l* to adhere thereto, thereby permitting the staff to be released from the controller, as previously described.

I have not herein specifically described nor have I illustrated any specific form of staff instrument. Any such instrument may be employed.

Having thus described my invention, what I claim, and desire to secure by Letters Patent, is—

1. A staff system for controlling traffic on railroads, having in combination a staff instrument located at each end of section of track to be protected, circuits extending between the instruments, and a controller or controllers located at a siding or sidings in section of track for said circuits and adapted to receive a staff removed from either one of said instruments, whereby said instruments are synchronized to permit of another staff being removed therefrom.

2. A staff system for controlling the traffic on railroads, having in combination a staff instrument located at each end of the section of track to be protected, a controller or controllers located at a siding or sidings in said section of track and electrically connected to said staff instruments, and adapted to receive a staff removed from either one of said instruments, and means for locking said staff within said controllers and for synchronizing said staff instruments to permit of the removal of another staff therefrom.

3. A staff system having in combination a staff instrument located at each end of a section of track to be protected, a controller or controllers located at a siding or sidings in said section of track and electrically connected to said staff instruments, adapted to receive a staff removed from either of said instruments, a locking provision for locking said staff in said controllers and thereby synchronizing said instruments, and means for releasing said locking provision to permit of the removal of said staff, whereby said instruments are thrown out of synchronism.

4. A staff system having in combination a staff instrument located at each end of a section of track to be protected, a controller or controllers located at a siding or sidings in said section of track and electrically connected to said instruments, adapted to receive a staff removed from either of said instruments, a locking provision for locking the staff in said controllers—and thereby synchronizing said instruments, a miniature signal-blade adapted to rise and fall to display the released and locked indication, and means for effecting such rise and fall of said blade and for releasing said staff whereby said instruments are thrown out of synchronism.

5. A controller electrically connected up with staff instruments at each end of a section of track to be protected, and comprising a rotatively-supported socket adapted to receive a staff removed from either of said instruments, a locking provision adapted to turn with said socket, means for engaging said locking provision whereby said socket is locked against movement, and means for releasing said locking provision and for electrically maintaining it in unlocked position to permit of the rotative movement of said socket and consequent release of the staff.

6. A controller comprising a rotatively-supported socket adapted to receive a staff, a locking provision adapted to lock said socket, means for releasing said locking provision, and magnets, electrically connected with staff instruments located at each end of a block, whereby said locking provision is held in released position to permit of the removal of said staff.

7. A controller comprising a rotatively-supported socket adapted to receive a staff, said socket having a provision for engaging the end of said staff whereby both may be rotated in unison, a locking provision adapted to lock said socket and staff against return movement, means for releasing said locking provision, and magnets electrically connected with staff instruments located at each end of a section of track to be protected, whereby said locking provision is held in released position to permit of the removal of said staff.

8. A controller comprising a rotatively-supported socket adapted to receive a staff, a provision therein for engaging said staff whereby both may be rotated in unison, a fixed tooth or projection adapted to enter a groove or kerf in said staff whereby the latter is locked in said socket, a locking provision adapted to lock the latter against return movement, a cam for releasing said locking provision, and magnets electrically connected with instruments located at each end of a section of track to be protected, whereby said locking provision is held in such released position to permit of the removal of said staff.

9. A controller comprising a rotatively-supported socket adapted to receive a staff, a provision therein for engaging said staff, whereby both may be rotated in unison, means for securing said staff within said socket, a locking provision adapted to lock the latter against return movement, means for releasing said locking provision, magnets electrically connected with staff instruments located at each end of a section of track to be protected, whereby said locking provision is held in such released position, and a switch for shifting the main current to and from said magnets.

In testimony whereof I have signed my name to this specification in the presence of two subscribed witnesses.

THOMAS H. PATENALL.

Witnesses:
JAS. JOHNSON,
W. L. MCDANIEL.